United States Patent
Fukusako et al.

(10) Patent No.: US 6,907,871 B2
(45) Date of Patent: Jun. 21, 2005

(54) IGNITION TIMING CONTROL SYSTEM AND METHOD FOR VARIABLE-CYLINDER INTERNAL COMBUSTION ENGINE AS WELL AS ENGINE CONTROL UNIT

(75) Inventors: Takaaki Fukusako, Saitama-ken (JP); Toshiaki Icyouda, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/834,838

(22) Filed: Apr. 30, 2004

(65) Prior Publication Data

US 2004/0237935 A1 Dec. 2, 2004

(30) Foreign Application Priority Data

May 27, 2003 (JP) ........................................ 2003-149283

(51) Int. Cl.[7] ................................................. F02P 3/06
(52) U.S. Cl. ................................... 123/594; 123/198 F
(58) Field of Search ...................... 123/198 DB, 198 F, 123/594, 618, 643, 320, 333, 395, 332

(56) References Cited

U.S. PATENT DOCUMENTS 4,977,876 A * 12/1990 Nanyoshi et al. ............ 123/333
5,680,849 A * 10/1997 Morikawa et al. .......... 123/520

* cited by examiner

Primary Examiner—Bibhu Mohanty
(74) Attorney, Agent, or Firm—Arent Fox, PLLC

(57) ABSTRACT

There is provided an ignition timing control system for a variable-cylinder internal combustion engine, which is capable of optimally reducing torque before the start of fuel cut-off operation, irrespective of whether the engine is in an all-cylinder operation mode or a partial-cylinder operation mode, thereby reducing shock caused by the fuel cut-off operation. When the internal combustion engine is operated under deceleration operating conditions, the start of cut-off of fuel supply is delayed for a predetermined time period, and ignition timing is corrected when the cut-off of fuel supply is being delayed for the predetermined time period. The amount of correction of the ignition timing is set to a different value depending on the operation mode.

15 Claims, 6 Drawing Sheets

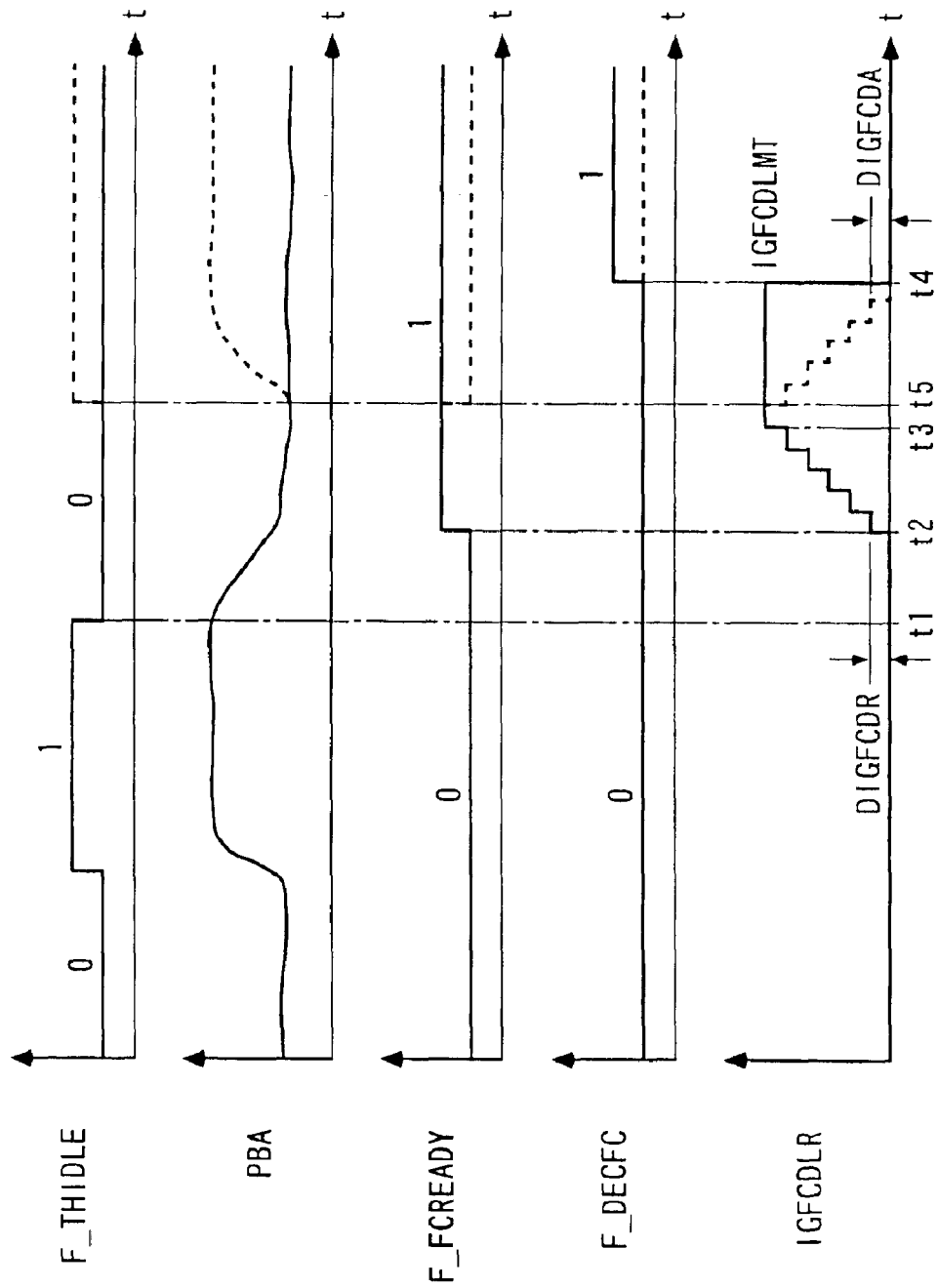

IGNITION TIMING CONTROL SYSTEM AND METHOD FOR VARIABLE-CYLINDER INTERNAL COMBUSTION ENGINE AS WELL AS ENGINE CONTROL UNIT

BACKGROUND OF THE INVENTION

1. Field of the Invention

The present invention relates to an ignition timing control system and method for a variable cylinder internal combustion engine which is operated by switching an operation mode thereof between an all-cylinder operation mode in which all of a plurality of cylinders are operated, and a partial-cylinder operation mode in which part of the plurality of cylinders are deactivated, as well as an engine control unit.

2. Description of the Prior Art

Conventionally, an ignition timing control system for a variable-cylinder internal combustion engine has been proposed e.g. in Japanese Laid-Open Patent Publication (Kokai) No. H10-30477 (FIG. 1, pages 3 and 4). This engine is not of the above variable-cylinder type but of a normal type. In the engine, when an idle switch is ON, i.e. when a throttle valve is in a substantially fully-closed state, and at the same time the rotational speed of the engine is equal to or higher than a predetermined fuel cut-off speed, it is determined that deceleration operating conditions are satisfied under which fuel cut-off operation for cutting off fuel supply to the engine should be carried out. Further, when the deceleration operating conditions are satisfied, the fuel cut-off operation is not instantly started but carried out after the lapse of a predetermined delay time period. More specifically, after satisfaction of the deceleration operating conditions, the ignition timing is not retarded until a first delay time period has elapsed, and thereafter, until a second delay time period has elapsed, the ignition timing is progressively retarded. Then, only after the lapse of the second delay time period, the fuel cut-off operation is started. Thus, the ignition timing is progressively retarded before the start of the fuel cut-off operation to progressively reduce torque, whereby shock is suppressed which is caused by suddenly reduced torque resulting from the fuel cut-off operation.

As described above, according to the conventional ignition timing control system, when it is determined that the deceleration operating conditions are satisfied, the ignition timing is retarded during the delay time period before the start of the fuel cut-off so as to suppress shock caused by the fuel cut-off operation. However, when the ignition timing control system is applied to the variable-cylinder internal combustion engine, there occurs the following problem: In the partial-cylinder operation mode, since part of the cylinders are deactivated, output torque per cylinder tends to be larger than in the all-cylinder operation mode, on condition that the same torque is output by the whole engine.

As a result, when the deceleration operating conditions are satisfied, if the engine is in the partial-cylinder operation mode, it is impossible to reduce the torque sufficiently even though the ignition timing is retarded by the above method, and hence there is a fear of a sudden reduction of torque at the start of the fuel cut-off operation causing a large toque shock.

The above inconvenience can be avoided, e.g. by setting the amount of retardation of the ignition timing to a larger value. However, if the engine is in the all-cylinder operation mode when the deceleration operating conditions are satisfied, the output torque per cylinder is so small that the ignition timing retarded using the amount of retardation set as above reduces the torque more than required, resulting in occurrence of shock or low rotational speed of the engine.

SUMMARY OF THE INVENTION

It is an object of the present invention to provide an ignition timing control system and method for a variable-cylinder internal combustion engine as well as an engine control unit, which are capable of optimally reducing torque before the start of fuel cut-off operation, irrespective of whether the engine is in an all-cylinder operation mode or in a partial-cylinder operation mode, thereby reducing shock caused by the fuel cut-off operation.

To attain the above object, in a first aspect of the present invention, there is provided an ignition timing control system for a variable-cylinder internal combustion engine which is operated by switching an operation mode thereof between an all-cylinder operation mode in which all of a plurality of cylinders are operated, and a partial-cylinder operation mode in which part of the plurality of cylinders are deactivated, the ignition timing control system comprising:

deceleration operation-determining means for determining whether or not the engine is operated under predetermined deceleration operating conditions;

fuel cut-off means for cutting off fuel supply to the engine, when it is determined by the deceleration operation-determining means that the engine is operated under the predetermined deceleration operating conditions;

fuel cut-off delay means for delaying a start of cut-off of the fuel supply by the fuel cut-off means for a predetermined time period after satisfaction of the predetermined deceleration operating conditions;

ignition timing-correcting means for correcting ignition timing in a retarding direction, when the cut-off of fuel supply is being delayed by the fuel cut-off delay means; and correction amount-setting means for setting an amount of correction of the ignition timing by the ignition timing-correcting means, to a different value, depending on whether the engine is in the all-cylinder operation mode or in the partial-cylinder operation mode.

With the arrangement of this ignition timing control system, the internal combustion engine is switched between the all-cylinder operation mode and the partial-cylinder operation mode, and when the engine is in the partial-cylinder operation mode, part of the cylinders are deactivated. Further, when it is determined by the deceleration operation-determining means that the engine is operated under the predetermined deceleration operating conditions, the start of cut-off of fuel supply is delayed for a predetermined time period by the fuel cut-off delay means, and thereafter, fuel supply to the engine is cut off by the fuel cut-off means. During the delay time period, the ignition timing is corrected in a retarding direction, and the amount of correction is set to a different value depending on whether the engine is in the all-cylinder operation mode or in the partial-cylinder operation mode. As described hereinabove, output torque per cylinder is different between the all-cylinder operation mode and the partial-cylinder operation mode. Therefore, by making the amount of correction or retardation of the ignition timing, performed during the delay time period before the start of the fuel cut-off operation different between the all-cylinder operation mode and the partial-cylinder operation mode, it is possible to optimally reduce the torque before the start of the fuel cut-off operation, in both of the operation modes, thereby making it possible to reduce shock caused by the fuel cut-off operation.

Preferably, the correction amount-setting means sets the amount of correction to a larger value when the engine is in the partial-cylinder operation mode than when the engine is in the all-cylinder operation mode.

Preferably, the correction amount-setting means progressively increases the amount of correction during the predetermined time period.

Preferably, the correction amount-setting means sets the amount of correction to a smaller value as a rotational speed of the engine is higher.

Preferably, the correction amount-setting means includes means for setting the amount of correction such that the ignition timing is progressively returned in an advancing direction, when the predetermined deceleration operating conditions cease to be satisfied before the predetermined time period elapses.

To attain the above object, in a second aspect of the present invention, there is provided a method of controlling ignition timing of a variable-cylinder internal combustion engine which is operated by switching an operation mode thereof between an all-cylinder operation mode in which all of a plurality of cylinders are operated, and a partial-cylinder operation mode in which part of the plurality of cylinders are deactivated, the method comprising the steps of:

determining whether or not the engine is operated under predetermined deceleration operating conditions;

cutting off fuel supply to the engine, when it is determined in the determining step that the engine is operated under the predetermined deceleration operating conditions;

delaying a start of cut-off of the fuel supply in the fuel supply cut-off step for a predetermined time period after satisfaction of the predetermined deceleration operating conditions;

correcting ignition timing in a retarding direction, when the cut-off of fuel supply is being delayed in the delaying step; and setting an amount of correction of the ignition timing in the delaying step, to a different value, depending on whether the engine is in the all-cylinder operation mode or in the partial-cylinder operation mode.

Preferably, the setting step includes setting the amount of correction to a larger value when the engine is in the partial-cylinder operation mode than when the engine is in the all-cylinder operation mode.

Preferably, the setting step includes progressively increasing the amount of correction during the predetermined time period.

Preferably, the setting step includes setting the amount of correction to a smaller value as a rotational speed of the engine is higher.

Preferably, the setting step includes setting the amount of correction such that the ignition timing is progressively returned in an advancing direction, when the predetermined deceleration operating conditions cease to be satisfied before the predetermined time period elapses.

To attain the above object, in a third aspect of the present invention, there is provided an engine control unit including a control program for causing a computer to control ignition timing of a variable-cylinder internal combustion engine which is operated by switching an operation mode thereof between an all-cylinder operation mode in which all of a plurality of cylinders are operated, and a partial-cylinder operation mode in which part of the plurality of cylinders are deactivated, wherein the control program causes the computer to determine whether or not the engine is operated under predetermined deceleration operating conditions, cut off fuel supply to the engine when it is determined that the engine is operated under the predetermined deceleration operating conditions, delay a start of cut-off of the fuel supply for a predetermined time period after satisfaction of the predetermined deceleration operating conditions, correct ignition timing in a retarding direction when the cut-off of fuel supply is being delayed, and set an amount of correction of the ignition timing, to a different value, depending on whether the engine is in the all-cylinder operation mode or in the partial-cylinder operation mode.

Preferably, the control program causes the computer to set the amount of correction to a larger value when the engine is in the partial-cylinder operation mode than when the engine is in the all-cylinder operation mode.

Preferably, the control program causes the computer to progressively increase the amount of correction during the predetermined time period.

Preferably, the control program causes the computer to set the amount of correction to a smaller value as a rotational speed of the engine is higher.

Preferably, the control program causes the computer to set the amount of correction such that the ignition timing is progressively returned in an advancing direction, when the predetermined deceleration operating conditions cease to be satisfied before the predetermined time period elapses.

The above and other objects, features, and advantages of the present invention will become more apparent from the following detailed description taken in conjunction with the accompanying drawings.

BRIEF DESCRIPTION OF THE DRAWINGS

FIG. 8 is a timing chart illustrating an example of operation performed by the ignition timing control system.

DETAILED DESCRIPTION OF THE PREFERRED EMBODIMENTS

Figure 1:
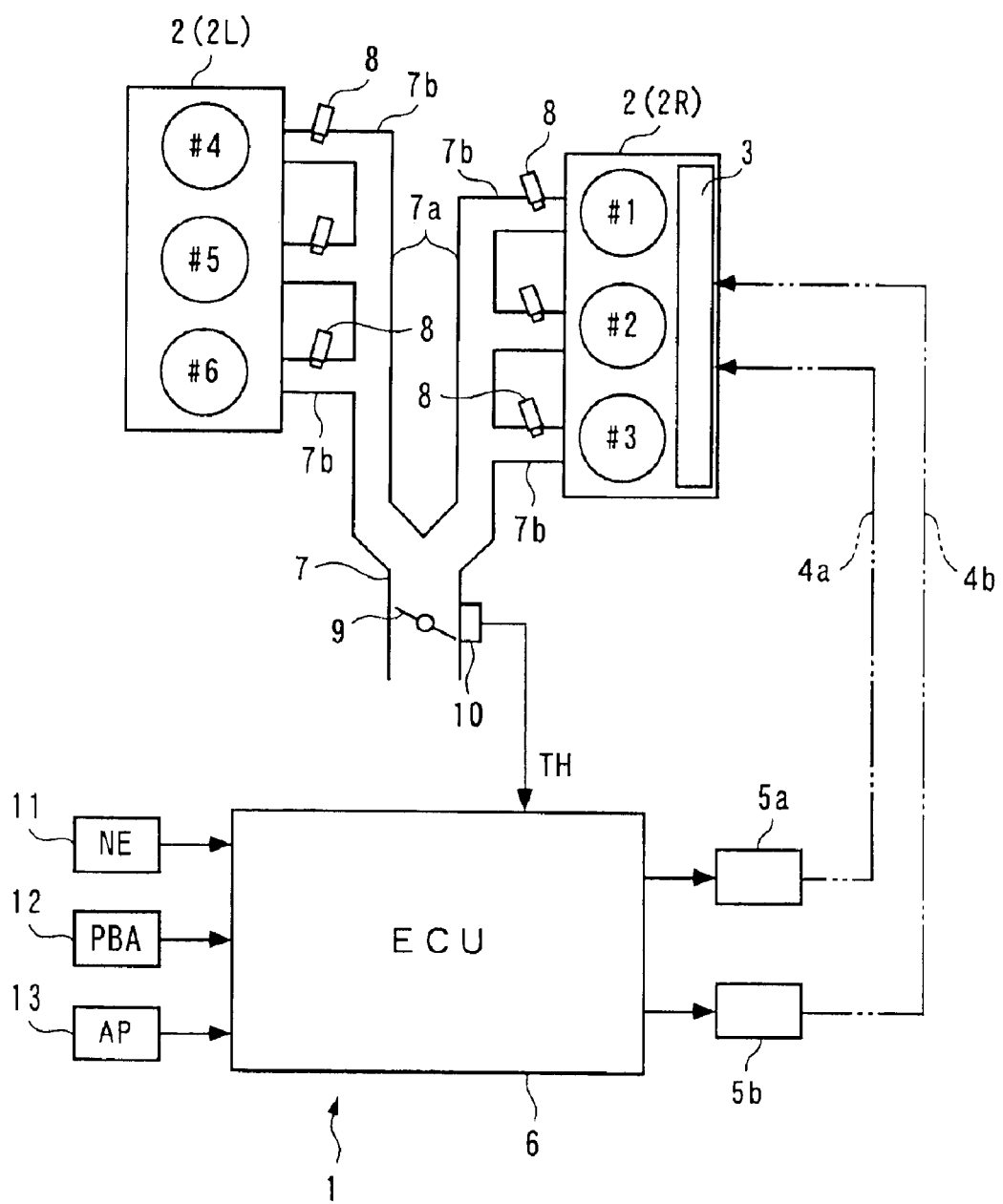
FIG. 1 is a block diagram schematically showing the arrangement of a variable-cylinder internal combustion engine to which is applied an ignition timing control system according to an embodiment of the present invention.

The present invention will now be described in detail with reference to the drawings showing a preferred embodiment thereof. Referring first to FIG. 1, there is schematically shown the arrangement of a variable-cylinder internal combustion engine 2 to which is applied an ignition timing control system 1 according to the embodiment of the present invention. This variable-cylinder internal combustion engine 2 (hereinafter simply referred to as "the engine 2") is a V type six-cylinder DOHC gasoline engine installed on a vehicle, not shown.

As shown in the figure, the engine 2 includes a right bank 2R of three cylinders #1, #2, and #3, and a left bank 2L of three cylinders #4, #5, and #6. The engine 2 is operated while switching the operation mode thereof between an all-cylinder operation mode and a partial-cylinder operation mode. Further, the right bank 2R is provided with a cylinder-deactivating mechanism 3 for carrying out the partial-cylinder operation mode.

The cylinder-deactivating mechanism 3 is connected to a hydraulic pump, not shown, via oil passages 4a and 4b. Arranged between the hydraulic pump and the cylinder-deactivating mechanism 3 are a solenoid valve 5a for intake valves and a solenoid valve 5b for exhaust valves. The solenoid valves 5a and 5b are both of a normally-closed type and electrically connected to an ECU 6, referred to hereinafter, and open the oil passages 4a and 4b, respectively, when they are turned on by drive signals delivered from the ECU 6. For the partial-cylinder operation mode of the engine 2, both of the solenoid valves 5a and 5b are turned on to open the oil passages 4a and 4b, whereby oil pressure from the hydraulic pump is supplied to the cylinder-deactivating mechanism 3. As a result, the intake valve and an intake cam, not shown, as well as the exhaust valve and an exhaust cam, not shown, are disconnected from each other in each of the cylinders #1 to #3 of the right bank 2R, whereby the intake valves and the exhaust valves of these cylinders #1 to #3 are held in a deactivated state (closed state).

For the all-cylinder operation mode of the engine 2, inversely to the above, both of the solenoid valves 5a and 5b are turned off to close the oil passages 4a and 4b, whereby the supply of oil pressure from the hydraulic pump to the cylinder-deactivating mechanism 3 is stopped. This terminates the disconnection of the intake valve and the intake cam and that of the exhaust valve and the exhaust cam in each of the cylinders #1 to #3 of the right bank 2R, whereby the intake valves and the exhaust valves of these cylinders #1 to #3 are made movable.

An intake pipe 7 is connected to the six cylinders #1 to #6 via an intake manifold 7a. The intake manifold 7a has branch portions 7b with injectors 8 inserted therein such that the injectors 8 face respective intake ports, not shown, of the cylinders. The injectors 8 are controlled by drive signals from the ECU 6 such that fuel is injected into the respective branch portions 7b from all the injectors 8 during the all-cylinder operation mode. On the other hand, during the partial-cylinder operation mode, the injectors 8 are controlled such that fuel injection by the three injectors 8 for the right bank 2R is stopped.

Thus, the cylinders #1 to #3 of the right bank 2R are deactivated during the partial-cylinder operation mode by the deactivated state of the intake valves and the exhaust valves thereof and interruption of fuel injection from the associated injectors 8, whereas during the all-cylinder operation mode, all the six cylinders #1 to #6 are operated.

The intake pipe 7 of the engine 2 has a throttle valve 9 arranged therein. The opening TH of the throttle valve 9 (hereinafter referred to as the "throttle valve opening TH") is sensed by a throttle valve opening sensor 10, and a signal indicative of the sensed throttle valve opening TH is supplied to the ECU 6.

Connected to the ECU 6 are an engine speed sensor 11, an intake pressure sensor 12, and an accelerator pedal opening sensor 13. The engine speed sensor 11 and the intake pressure sensor 12 detect the rotational speed NE of the engine 2 (hereinafter referred to as "the engine speed NE") and the absolute pressure PBA within the intake pipe 7 (hereinafter referred to as the "intake pipe absolute pressure PBA"), respectively, and deliver respective signals indicative of the detected engine speed NE and intake pipe absolute pressure PBA to the ECU 6. The accelerator pedal opening sensor 13 detects the amount of depression AP of an accelerator pedal, not shown, (hereinafter referred to as the "accelerator pedal opening AP") of the vehicle on which the engine 2 is installed, and delivers a signal indicative of the detected accelerator pedal opening AP to the ECU 6. Further, along with the rotation of the engine 2, the engine speed sensor 11 delivers a TDC signal to the ECU 6, at a predetermined crank angle position in the vicinity of a top dead center position before the intake stroke of a piston, not shown, in each of the cylinders #1 to #6.

The ECU 6 forms, in the present embodiment, deceleration operation-determining means, fuel cut-off means, fuel cut-off delay means, ignition timing-correcting means, and correction amount-setting means. The ECU 6 is implemented by a microcomputer including an I/O interface, a CPU, a RAM, and a ROM, none of which are specifically shown. The signals delivered from the sensors 10 to 13 are each input to the CPU via the I/O interface.

The CPU determines an operating condition of the engine 2 based on the signals received from the sensors 10 to 13 in accordance with programs read from the ROM, and depending on the determined operating condition, carries out the control processes described hereinafter. First, the CPU determines which of the all-cylinder operation mode and the partial-cylinder operation mode should be set to the operation mode of the engine 2. More specifically, when the engine speed NE is within a predetermined range (e.g. 1000 to 3500 rpm), or when the accelerator pedal opening AP is smaller than a table value set in advance according to the engine speed NE, the partial-cylinder operation mode is carried out, and otherwise the all-cylinder operation mode is performed.

Further, the ECU 6 determines whether or not executing conditions for executing operation for cutting off fuel supply (hereinafter referred to as the "fuel cut-off operation") to the engine 2 are satisfied, and carries out control for retarding an ignition timing IGLOG, before performing the fuel cut-off operation.

Figure 2:
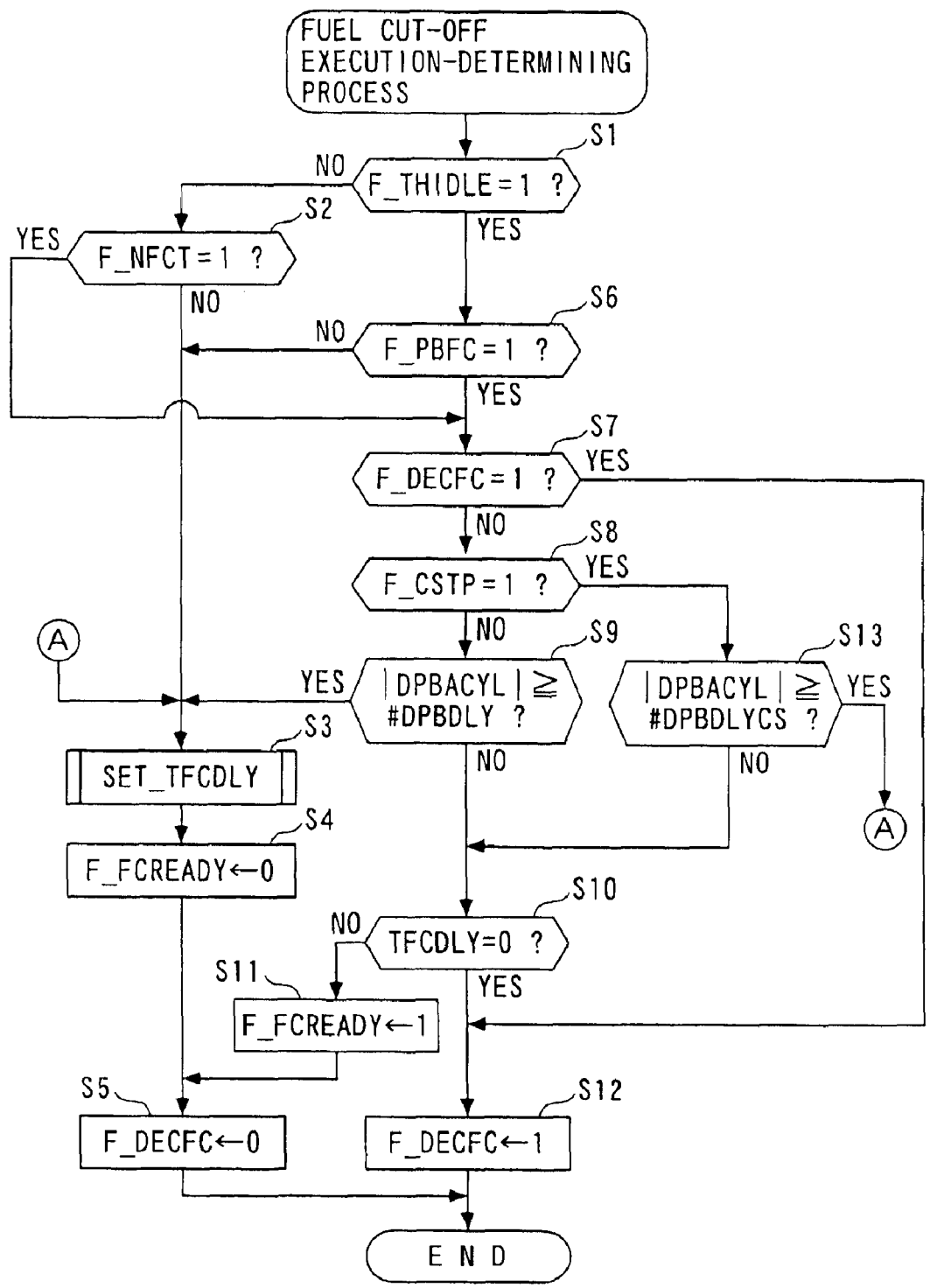
FIG. 2 is a flowchart showing a main flow of an execution-determining process for determining whether or not fuel cut-off operation should be executed.

FIG. 2 is a flowchart showing a main flow of an execution-determining process for determining whether or not fuel cut-off operation should be executed. This process is executed in synchronism with generation of each pulse of the TDC signal. As shown in the figure, first, in a step 1 (simplified to "S1" in FIG. 1; the following steps are also shown in the simplified manner), it is determined whether or not a throttle valve opening flag F_THIDLE is equal to 1. The throttle valve opening flag F_THIDLE is set to 1 when the detected throttle valve opening TH is equal to or larger than an idle opening THIDLE corresponding to a slightly open state of the throttle valve 9, whereas when the detected throttle valve opening TH is smaller than the idle opening THIDLE, which corresponds to a substantially fully-closed state of the throttle valve 9, the throttle valve opening flag F_THIDLE is set to 0.

If the answer to the question of the step 1 is negative (NO), i.e. if the throttle valve 9 is in the substantially fully-closed state, the process proceeds to a step 2 wherein it is determined whether or not an engine speed flag F_NFCT is equal to 1. The engine speed flag F_NFCT is set to 1 when the detected engine speed NE is equal to or higher than a predetermined rotational speed NFCT for determination of execution of the fuel cut-off operation, whereas when the detected engine speed NE is lower than the predetermined rotational speed NFCT, the engine speed flag F_NFCT is set to 0.

If the answer to the question of the step 2 is negative (NO), i.e. if the engine speed NE is lower than the predetermined rotational speed NFCT, it is judged that the executing conditions are not satisfied, so that the timer value TFCDLY of a delay timer of a downcount type is set to a predetermined time period in a step 3, and an executing condition satisfaction flag F_FCREADY is set to 0 in a step 4. This delay timer is used for counting time to be taken for the intake pipe absolute pressure PBA to become stable. In the all-cylinder operation mode, the intake pipe absolute pressure PBA becomes stable more rapidly than in the partial-cylinder operation mode, so that the above predetermined time period is set to e.g. 0.5 seconds in the all-cylinder operation mode, whereas it is set to e.g. 0.8 seconds in the partial-cylinder operation mode. Further, since the executing conditions are not satisfied, it is judged that the fuel cut-off operation should not be executed, so that a fuel cut-off operation execution flag F_DECFC is set to 0 in a step 5, followed by terminating the present process.

On the other hand, if the answer to the question of the step 2 is affirmative (YES), i.e. if the engine speed NE is equal to or higher than the predetermined rotational speed NFCT, the process proceeds to a step 7 et. seq., referred to hereinafter.

If the answer to the question of the step 1 is affirmative (YES), i.e. if the throttle valve opening flag F_THIDLE=1 holds, which means that the throttle valve 9 is not in the fully-closed state, the process proceeds to a step 6, wherein it is determined whether or not an intake pipe absolute-pressure flag F_PBFC is equal to 1. The intake pipe absolute pressure flag F_PBFC is set to 1 when the intake pipe absolute pressure PBA detected by the intake pressure sensor 12 is within a predetermined region for executing the fuel cut-off operation, whereas when the intake pipe absolute pressure PBA is not within the predetermined region, the intake pipe absolute pressure flag F_PBFC is set to 0. If the answer to the question of the step 6 is negative (NO), i.e. if the intake pipe absolute pressure PBA is not within the predetermined region, it is judged that the executing conditions are not satisfied, so that the process proceeds to the step 3 et. seq., followed by terminating the present process.

On the other hand, if the answer to the question of the step 6 is affirmative (YES), i.e. if the intake pipe absolute pressure PBA is within the predetermined region for executing the fuel cut-off operation, the process proceeds to the step 7, wherein it is determined whether or not the fuel cut-off operation execution flag F_DECFC is equal to 1. If the answer to the question is negative (NO), i.e. if the fuel cut-off operation is not being executed, the process proceeds to a step 8, wherein it is determined whether or not an operation mode flag F_CSTP is equal to 1. The operation mode flag F_CSTP is set to 1 when the operation mode of the engine 2 is the partial-cylinder operation mode, whereas when the operation mode is the all-cylinder operation mode, the operation mode flag F_CSTP is set to 0. If the answer to the question of the step 8 is negative (NO), i.e. if the engine 2 is in the all-cylinder operation mode, the process proceeds to a step 9, wherein it is determined whether or not the absolute value of the amount DPBACYL of change in the intake pipe pressure is equal to or larger than a predetermined amount #DPBDLY (e.g. 12 mmHg) set for the all-cylinder operation mode.

The amount DPBACYL of change in the intake pipe pressure represents the difference between the present value PBA(n) of the intake pipe absolute pressure and the value PBA(n-6) of the same, detected six TDC cycles before, which corresponds to the amount of change in the intake pipe absolute pressure PBA per one engine operation cycle. If the answer to the question of the step 9 is affirmative (YES), i.e. if |DPBACYL|≧#DPBDLY holds, it is judged that the executing conditions are not satisfied, since the amount of change in the intake pipe absolute pressure PBA is large, so that the process proceeds to the step 3 et. seq., followed by terminating the present process.

On the other hand, if the answer to the question of the step 9 is negative (NO), i.e. if |DPBACYL|<#DPBDLY holds, it is judged that the intake pipe absolute pressure PBA has become stabile, and the engine 2 is being operated under predetermined deceleration operating conditions, in short, that the executing conditions are satisfied, so that the process proceeds to a step 10, wherein it is determined whether or not the timer value TFCDLY of the delay timer is equal to 0. If the answer to this question is negative (NO), i.e. if the predetermined time period has not elapsed after satisfaction of the executing conditions, it is judged that the delay time is elapsing and the fuel cut-off operation is being awaited, so that the executing condition satisfaction flag F_FCREADY is set to 1 in the step 11. Then, the process proceeds to the step 5, whereby the start of the fuel cut-off operation is suspended, followed by terminating the present process.

On the other hand, if the answer to the question of the step 10 is affirmative (YES), i.e. if the timer value TFCDLY of the delay timer=0 holds, which means that the predetermined time period has elapsed after satisfaction of the executing conditions, it is judged that the fuel cut-off operation should be started, so that the fuel cut-off operation execution flag F_DECFC is set to 1 in a step 12, followed by terminating the present process.

If the answer to the question of the step 8 is affirmative (YES), i.e. if the operation mode of the engine 2 is the partial-cylinder operation mode, the process proceeds to a step 13, wherein it is determined whether or not the absolute value of the amount DPBACYL of change in the intake pipe pressure is equal to or larger than a predetermined amount #DPBDLYCS (e.g. 8 mmHg) set for the partial-cylinder operation mode. If the answer to the question of the step 13 is affirmative (YES), i.e. if |DPBACYL|≧#DPBDLYCS holds, it is judged that the executing conditions are not satisfied, so that the process proceeds to the step 3 et. seq., followed by terminating the present process.

On the other hand, if the answer to the question of the step 13 is negative (NO), i.e. if |DPBACYL|<#DPBDLYCS holds, it is judged that the intake pipe absolute pressure PBA has become stable, which means that the executing conditions are satisfied, so that the process proceeds to the step 10 et. seq., followed by terminating the present process.

Further, if the answer to the question of the step 7 is affirmative (YES), i.e. if the fuel cut-off operation is already being executed, the process proceeds to the step 12 to continue the fuel cut-off operation, followed by terminating the present process.

Figure 3:
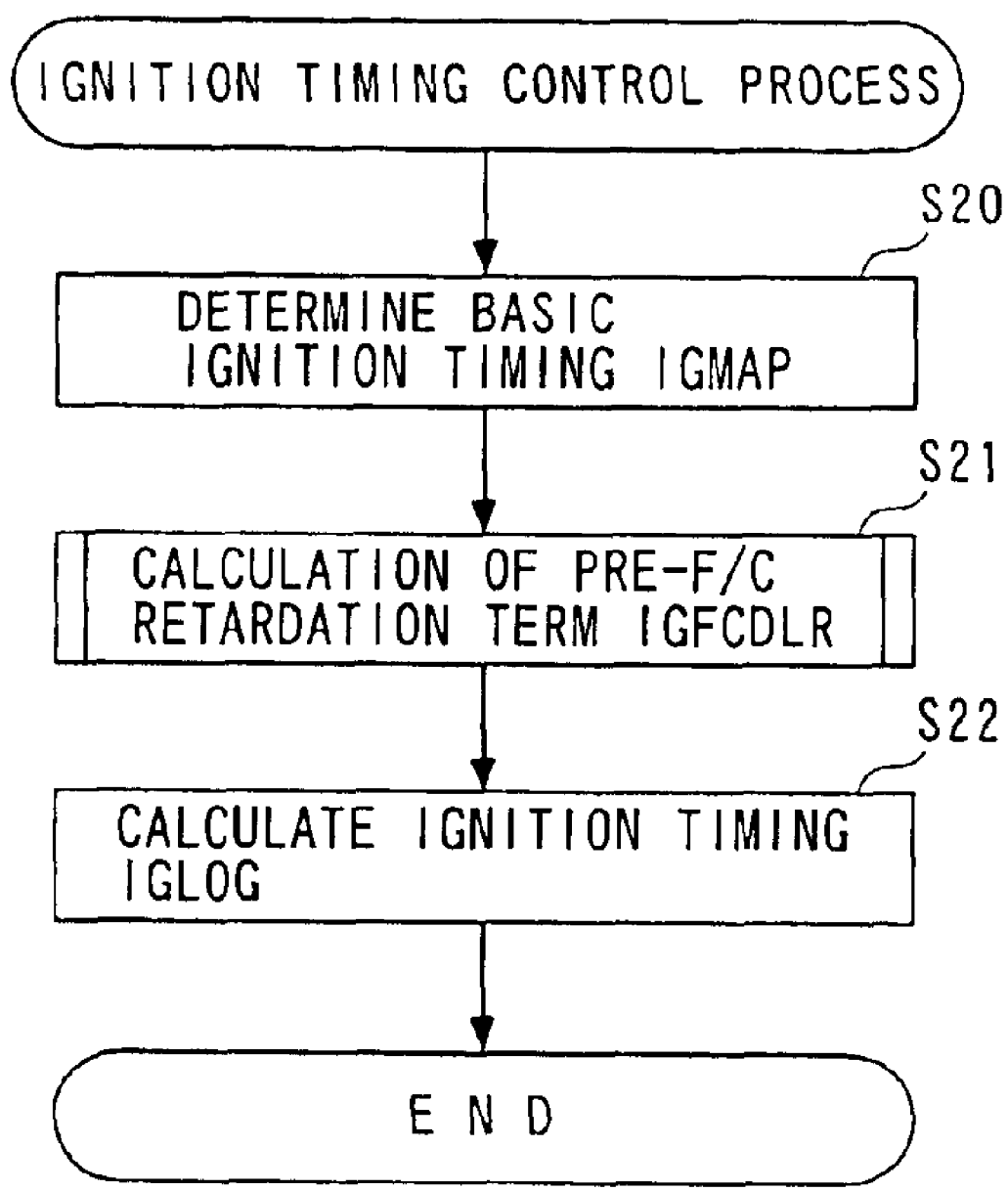
FIG. 3 is a flowchart showing a main flow of an ignition timing control process executed by the ignition timing control system in FIG. 1.

FIG. 3 is a flowchart showing a main flow of an ignition timing control process. This process is executed in synchronism with generation of each pulse of the TDC signal.

In the present process, first, in a step 20, a basic ignition timing IGMAP is determined with reference to a map, not shown, according to the engine speed NE and the intake pipe absolute pressure PBA.

Next, a pre-fuel cut-off retardation term (hereinafter referred to as the "pre-F/C retardation term") IGFCDLR is calculated in a step 21. The pre-F/C retardation term IGFCDLR is applied to Equation (1), referred to hereinafter, during the delay time after satisfaction of the executing conditions and before the start of execution of the fuel cut-off operation, so as to retard the ignition timing IGLOG for gentle reduction of the torque of the engine 2. The method of calculating the pre-F/C retardation term IGFCDLR will be described in detail hereinafter.

Next, in a step 22, the ignition timing IGLOG is calculated using the basic ignition timing IGMAP determined in the step 20 and the pre-F/C retardation term IGFCDLR calculated in the step 21, by the following Equation (1), followed by terminating the present process.

$$IGLOG=IGMAP-IGFCDLR+IGCRO \quad (1)$$

In the equation, IGCRO collectively represents correction terms other than IGFCDLR, and includes, for example, a coolant temperature-dependent advance amount determined according to the engine coolant temperature, an intake air temperature-dependent advance amount determined according to the intake air temperature, and a warm-up accelerating advance amount for accelerating the warming-up of the engine at a cold start thereof.

Figure 4:
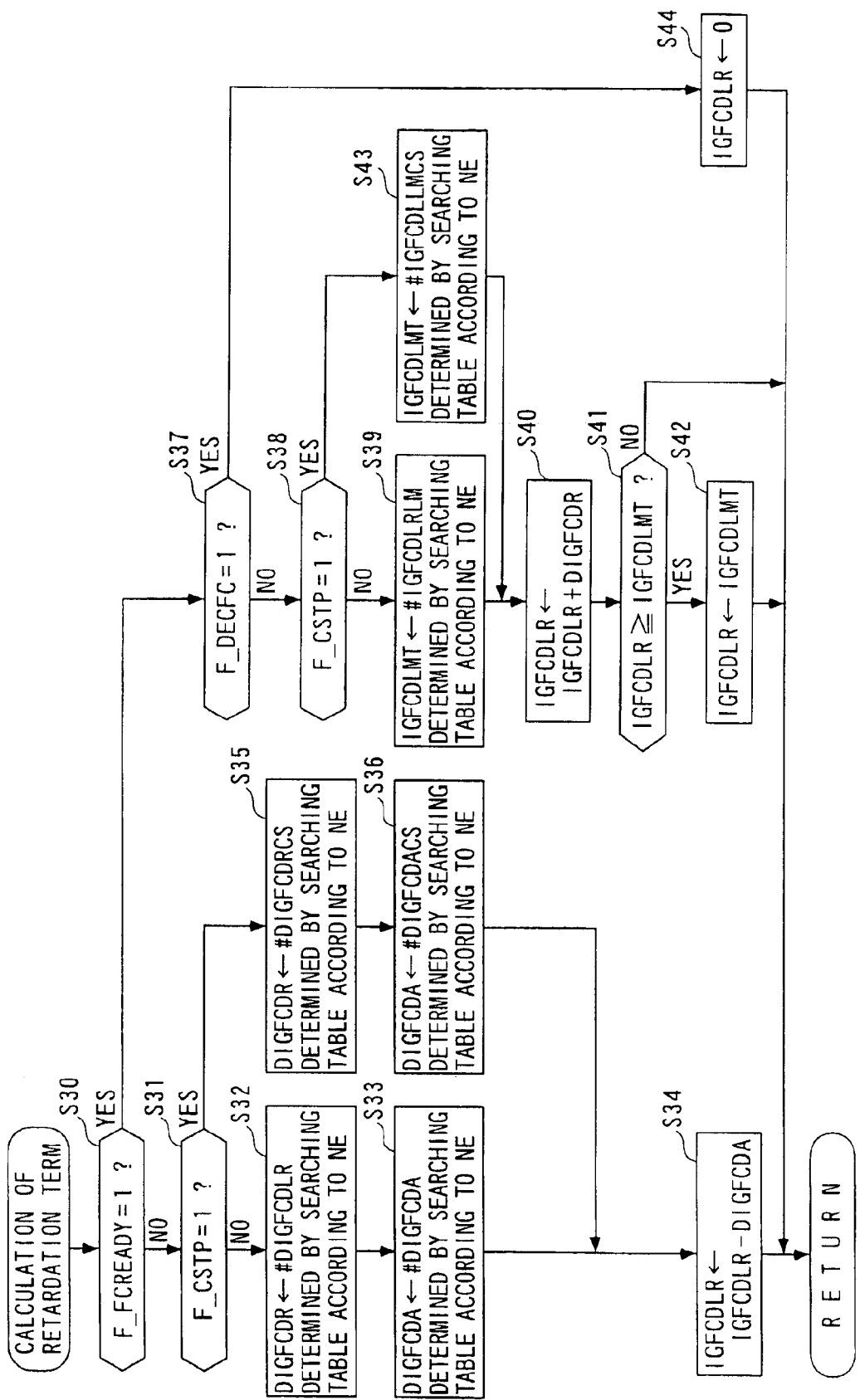
FIG. 4 is a flowchart showing the subroutine of a process for calculating a pre-F/C retardation term, executed in the FIG. 3 main flow.

FIG. 4 shows the subroutine of a process for calculating the pre-F/C retardation term IGFCDLR, which is executed in the step 21 in the FIG. 3 main flow. In the present process, first, it is determined in a step 30 whether or not the executing condition satisfaction flag F_FCREADY is equal to 1. If the answer to the question is negative (NO), i.e. if the executing conditions are not satisfied, the process proceeds to a step 31, wherein it is determined whether or not the operation mode flag F_CSTP is equal to 1. If the answer to the question is negative (NO), i.e. if the operation mode is the all-cylinder operation mode, the process proceeds to a step 32, wherein a table value #DIGFCDLR is determined by searching a #DIGFCDLR table set for the all-cylinder operation mode according to the engine speed NE, and set to an additional amount DIGFCDR to be added to the pre-F/C retardation term IGFCDLR.

Figure 5:
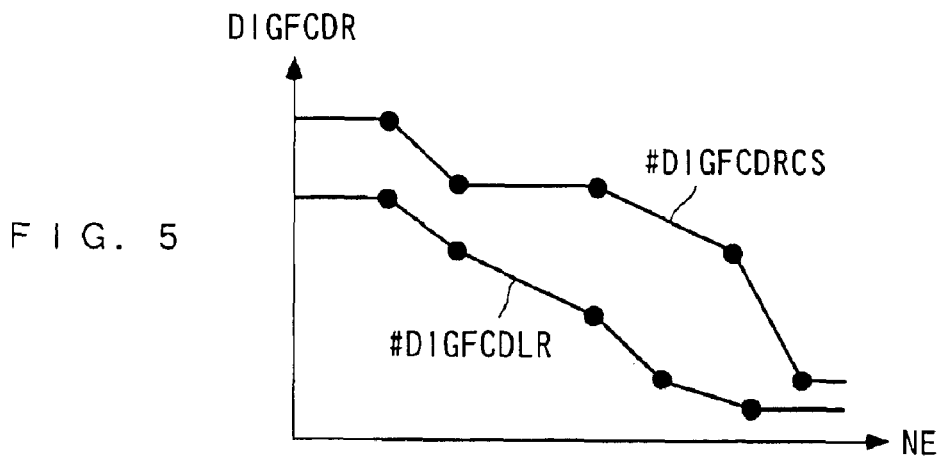
FIG. 5 shows examples of tables each searched in determining an additional amount DIGFCDR to be added to the pre-F/C retardation term.

FIG. 5 shows an example of the #DIGFCDLR table set for the all-cylinder operation mode. In the table, the table value #DIGFCDLR is set to a smaller value as the engine speed NE is higher. This is because as the engine speed NE is higher, the torque decreases more steeply as the throttle valve 9 closes, and hence, for gentle reduction of the torque, the degree of retardation of the ignition timing is reduced so as to prevent the torque from being reduced more than required before the start of the fuel cut-off operation. It should be noted that the table value #DIGFCDLR is set for each of five grid points of the engine speed NE. Between the grid points, the table value #DIGFCDLR is calculated by interpolation. The same applies to other tables referred to hereinafter.

Referring again to FIG. 4, in a step 33 following the step 32, a table value #DIGFCDA is determined by searching a #DIGFCDA table set for the all-cylinder operation mode, according to the engine speed NE, and set to a subtractive amount (returning amount) DIGFCDA to be subtracted from the pre-F/C retardation term IGFCDLR.

Figure 6:
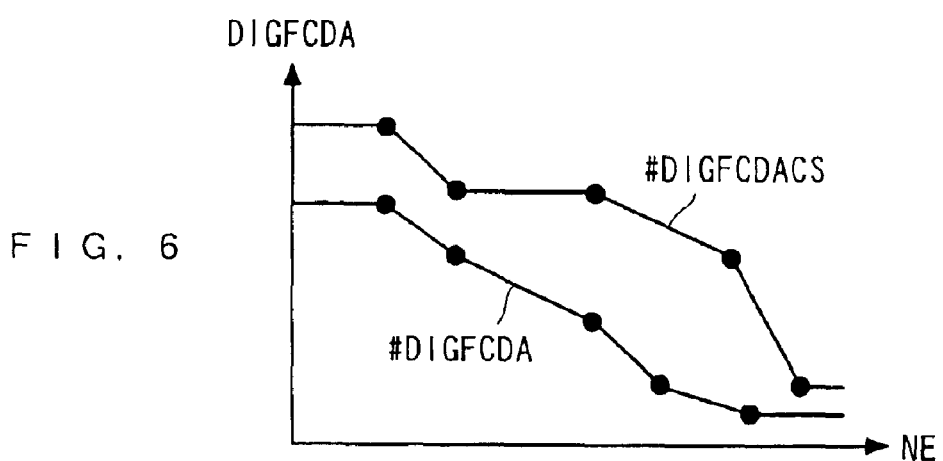
FIG. 6 shows examples of tables each searched in determining a subtractive amount DIGFCDA to be subtracted from the pre-F/C retardation term.

FIG. 6 shows an example of the #DIGFCDA table set for the all-cylinder operation mode. In this table as well, the table value #DIGFCDA is set to a smaller value as the engine speed NE is higher. This is because as the engine speed NE is higher, the additional amount DIGFCDR to be added to the pre-F/C retardation term IGFCDLR is set to a smaller value, for the reason described above, so that the subtractive amount DIGFCDA is set in a manner corresponding to the additional amount DIGFCDLR.

If the answer to the question of the step 31 is affirmative (YES), i.e. if the operation mode is the partial-cylinder operation mode, the process proceeds to a step 35, wherein a table value #DIGFCDRCS is determined by searching a #DIGFCDRCS table set for the partial-cylinder operation mode according to the engine speed NE, and set to the additional amount DIGFCDR to be added to the pre-F/C retardation term IGFCDLR.

FIG. 5 shows an example of the #DIGFCDRCS table set for the partial-cylinder operation mode. In the table, for the same reason as in the case of the table value #DIGFCDLR set for the all-cylinder operation mode, the table value #DIGFCDRCS is set to a smaller value as the engine speed NE is higher. Further, the table value #DIGFCDRCS is set to a larger value than a corresponding value of the table value #DIGFCDLR set for the all-cylinder operation mode, in the entire region of the engine speed NE. This is because in the partial-cylinder operation mode, output torque per cylinder is larger than in the all-cylinder operation mode, on condition that the same torque is output by the whole engine 2, and hence the degree of retardation of the ignition timing is increased in comparison with the all-cylinder operation mode to thereby reduce the output torque more rapidly.

Referring again to FIG. 4, in a step 36 following the step 35, a table value #DIGFCDACS is determined by searching a #DIGFCDACS table set for the partial-cylinder operation mode according to the engine speed NE, and set to the subtractive amount DIGFCDA to be subtracted from the pre-F/C retardation term IGFCDLR.

FIG. 6 shows an example of the #DIGFCDACS table set for the partial-cylinder operation mode. In the table, the table value #DIGFCDACS is set in a manner corresponding to the table value #DIGFCDRCS for the additional amount DIGFCDR. More specifically, the table value #DIGFCDACS is set to a smaller value as the engine speed NE is higher, and at the same time set to a larger value than a corresponding value of the table value #DIGFCDA for the all-cylinder operation mode.

Referring again to FIG. 4, in a step 34 following the step 33 or the step 36, a value obtained by subtracting the subtractive amount DIGFCDA set in the step 33 or 36 from the immediately preceding value of the pre-F/C retardation term IGFCDLR is set to the current pre-F/C retardation term IGFCDLR, followed by terminating the present process. This is because when the executing conditions cease to be satisfied e.g. by the accelerator pedal being stepped on during the delay time before the start of the fuel cut-off operation, the retarded ignition timing is progressively advanced, as described hereinafter, to thereby prevent torque shock from being caused by abrupt and instant cancellation of the retardation.

If the answer to the question of the step 30 is affirmative (YES), i.e. if the executing conditions are satisfied, the process proceeds to a step 37, wherein it is determined whether or not the fuel cut-off operation execution flag F_DECFC is equal to 1. If the answer to this question is negative (NO), i.e. if it is during the delay time before the start of the fuel cut-off operation, so as to retard the ignition timing during the delay time, the process proceeds to a step 38, wherein it is determined whether or not the operation mode flag F_CSTP is equal to 1. If the answer to the question is negative (NO), i.e. if the operation mode is the all-cylinder operation mode, the process proceeds to a step 39, wherein a table value #IGFCDLRLM is calculated by searching a #IGFCDLRLM table set for the all-cylinder operation mode according to the engine speed NE, and set to a limit value IGFCDLMT for the pre-F/C retardation term IGFCDLR.

Figure 7:
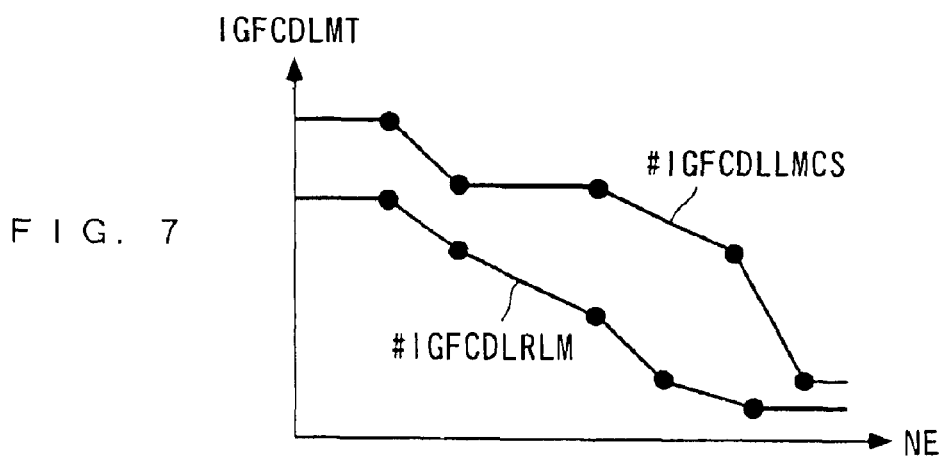
FIG. 7 shows examples of tables each searched in determining a limit value IGFCDLMT of the pre-F/C retardation term.

FIG. 7 shows an example of the #IGFCDLRLM table set for the all-cylinder operation mode. In the table, the table value #IGFCDLRLM is set to a smaller value as the engine speed NE is higher. This is because as the engine speed NE is higher, the torque decreases more steeply as the throttle valve 9 closes, so that limitation on the retardation is made more strict.

If the answer to the question of the step 38 is affirmative (YES), i.e. if the operation mode is the partial-cylinder operation mode, the process proceeds to a step 43, wherein a table value #IGFCDLLMCS is determined by searching a #IGFCDLLMCS table set for the partial-cylinder operation mode according to the engine speed NE, and set to the limit value IGFCDLMT for the pre-F/C retardation term IGFCDLR.

FIG. 7 shows an example of the #IGFCDLLMCS table set for the partial-cylinder operation mode. In the table, for the same reason as in the case of the table value #IGFCDLRLM adapted to the all-cylinder operation mode, the table value #IGFCDLLMCS is set to a smaller value as the engine speed NE is higher. Further, the table value #IGFCDLLMCS is set to a larger value than a corresponding value of the table value #IGFCDLRLM for the all-cylinder operation mode, in the entire region of the engine speed NE. This is because, as described above, in the partial-cylinder operation mode, the output torque per cylinder is larger than in the all-cylinder operation mode, and hence the limitation on retardation is loosened in comparison with the all-cylinder operation mode.

Referring again to FIG. 4, in a step 40 following the step 39 or the step 43, a value obtained by adding the additional amount DIGFCDR determined in the step 32 or 35 to the immediately preceding value of the pre-F/C retardation term IGFCDLR is set to the present value of the pre-F/C retardation term IGFCDLR. As the step 40 is repeatedly executed, the pre-F/C retardation term IGFCDLR is progressively increased, and the pre-F/C retardation term IGFCDLR thus increased is applied to the Equation (1), whereby during the delay time before the start of the fuel-cut-off operation, the ignition timing IGLOG is progressively retarded, so that the output torque gently decreases accordingly.

Then, in a step 41, it is determined whether or not the pre-F/C retardation term IGFCDLR calculated in the step 40 is equal to or larger than the limit value IGFCDLMT set in the step 39 or 43. If the answer to the question is negative (NO), i.e. if IGFCDLR<IGFCDLMT holds, the process is immediately terminated.

On the other hand, if the answer to the question of the step 41 is affirmative (YES), i.e. if IGFCDLR≧IGFCDLMT holds, the pre-F/C retardation term IGFCDLR is set to the limit value IGFCDLMT in a step 42, followed by terminating the present process.

Further, if the answer to the question of the step 37 is affirmative (YES), i.e. if the fuel cut-off operation is being executed, the pre-F/C retardation term IGFCDLR is set to 0 in a step 44, followed by terminating the present process.

FIG. 8 shows an example of operation of the ignition timing control system 1 performed by the ignition timing control process described above. Solid lines in FIG. 8 indicate a case where the fuel cut-off operation is carried out after the lapse of the delay time after satisfaction of the executing conditions, while broken lines in the same indicate a case where the fuel cut-off operation is not carried out since the executing conditions cease to be satisfied during the delay time. First, at a time t1, when the throttle valve 9 is substantially fully closed, the throttle valve opening flag F_THIDLE is set to 0. Then, when the intake pipe absolute pressure PBA decreases and becomes stable, the answer to the question of the step 9 or the step 13 becomes negative (NO), so that the executing condition satisfaction flag F_FCREADY is set to 1 (time t2), for transition to the delay time period.

During the delay time period, the step 40 is executed whenever each pulse of the TDC signal is generated, whereby the additional amount DIGFCDR is added to the pre-F/C retardation term IGFCDLR, which progressively retards the ignition timing IGLOG.

Subsequently, at a time t3, when the pre-F/C retardation term IGFCDLR reaches the limit value IGFCDLMT, the step 42 is carried out to thereby set the pre-F/C retardation term IGFCDLR to the limit value IGFCDLMT. Then, when the predetermined period has elapsed after satisfaction of the executing conditions (time t2), the timer value TFCDLY of the delay timer becomes equal to 0 at a time t4 (Yes to step 10), whereupon the fuel cut-off operation execution flag F_DECFC is set to 1 (step 12) to start the fuel cut-off operation, and the pre-F/C retardation term IGFCDLR is set to 0 (step 44).

On the other hand, as shown by the broken lines, during the delay time, if the accelerator pedal is stepped on (time t5), the throttle valve opening flag F_THIDLE is set to 1, and in response to an increase in the intake pipe absolute pressure PBA, the executing condition satisfaction flag F_FCREADY is set to 0 (step 4). After that, whenever each pulse of the TDC signal is generated, the step 34 is executed to subtract the subtractive amount DIGFCDA from the pre-F/C retardation term IGFCDLR, whereby the retarded ignition timing is progressively advanced. Thus, the retarded ignition timing is progressively advanced when the executing conditions cease to be satisfied during the delay time, whereby it is possible to avoid a sudden change in torque due to abrupt and instant cancellation of retardation to thereby prevent torque shock from occurring.

As described heretofore, according to the present embodiment, when the engine 2 is operated under predetermined deceleration operating conditions, satisfying the executing conditions, the fuel cut-off operation is started after the lapse of a predetermined delay time period, and during the delay time period, the ignition timing is progressively retarded by the pre-F/C retardation term IGFCDLR. This makes it possible to reduce shock at the start of the fuel cut-off operation. Further, in the partial-cylinder operation mode of the engine 2, the additional amount DIGFCDR to be added to the pre-F/C retardation term IGFCDLR is set to a larger value than in the all-cylinder operation mode of the same. This makes it possible to optimally reduce torque before the start of the fuel cut-off operation, in both of the operation modes, whereby it is possible to reduce shock caused by the fuel cut-off operation.

It should be noted that the present invention is by no means limited to the embodiment described above, but it can be practiced in various forms. For example, although in the embodiment, to execute the partial-cylinder operation mode, the engine 2 is configured such that the three cylinders #1 to #3 of the right bank 2R are deactivated by the cylinder-deactivating mechanism 3, by way of example, this is not limitative, but it goes without saying that the number of cylinders deactivated in the partial-cylinder operation mode is not limited to the above number. For example, the variable-cylinder internal combustion engine with six-cylinders according to the embodiment may be configured such that out of one to five cylinders, a desired number of cylinders are deactivated. Further, although the engine speed NE is used as a parameter for determining the additional amount DIGFCDR to be added to the pre-F/C retardation term IGFCDLR, any other suitable parameter may be employed in place of the engine speed NE.

When fuel supply is resumed after the executing conditions cease to be satisfied during execution of the fuel cut-off operation, the ignition timing may be retarded to thereby prevent torque shock from occurring at the time point of resuming the fuel supply. In this case, by setting the retardation amount separately to a value for the all-cylinder operation mode, and a value for the partial-cylinder operation mode, which is set to a larger value than a corresponding value for the all-cylinder operation mode, according the engine speed NE, it is possible to prevent torque shock more appropriately. Further, by setting the returning or advancing amount for progressively advancing the retarded ignition timing separately to a value for the all-cylinder operation mode, and a value for the partial-cylinder operation mode, which is set to a larger value than a corresponding value for the all-cylinder operation mode, according the engine speed NE, it is possible to prevent torque shock more appropriately. Further, by setting the above returning amount to a larger value as the throttle valve opening TH is larger, it is possible to enhance responsiveness to the demand of acceleration by the driver.

Further, the ignition timing control system according to the present invention can be applied not only to the variable-cylinder internal combustion engine installed on a vehicle, according to the present embodiment, but also to various types of industrial variable-cylinder internal combustion engines including engines for ship propulsion machines, such as an outboard motor having a vertically-disposed crankshaft.

It is further understood by those skilled in the art that the foregoing is a preferred embodiment of the invention, and that various changes and modifications may be made without departing from the spirit and scope thereof.

What is claimed is:

1. An ignition timing control system for a variable-cylinder internal combustion engine which is operated by switching an operation mode thereof between an all-cylinder operation mode in which all of a plurality of cylinders are operated, and a partial-cylinder operation mode in which part of the plurality of cylinders are deactivated, the ignition timing control system comprising:

deceleration operation-determining means for determining whether or not the engine is operated under predetermined deceleration operating conditions;

fuel cut-off means for cutting off fuel supply to the engine, when it is determined by said deceleration operation-determining means that the engine is operated under the predetermined deceleration operating conditions;

fuel cut-off delay means for delaying a start of cut-off of the fuel supply by said fuel cut-off means for a predetermined time period after satisfaction of the predetermined deceleration operating conditions;

ignition timing-correcting means for correcting ignition timing in a retarding direction, when the cut-off of fuel supply is being delayed by said fuel cut-off delay means; and correction amount-setting means for setting an amount of correction of the ignition timing by said ignition timing-correcting means, to a different value, depending on whether the engine is in the all-cylinder operation mode or in the partial-cylinder operation mode.

2. An ignition timing control system as claimed in claim 1, wherein said correction amount-setting means sets the amount of correction to a larger value when the engine is in the partial-cylinder operation mode than when the engine is in the all-cylinder operation mode.

3. An ignition timing control system as claimed in claim 1, wherein said correction amount-setting means progressively increases the amount of correction during the predetermined time period.

4. An ignition timing control system as claimed in claim 1, wherein said correction amount-setting means sets the amount of correction to a smaller value as a rotational speed of the engine is higher.

5. An ignition timing control system as claimed in claim 1, wherein said correction amount-setting means includes means for setting the amount of correction such that the ignition timing is progressively returned in an advancing direction, when the predetermined deceleration operating conditions cease to be satisfied before the predetermined time period elapses.

6. A method of controlling ignition timing of a variable-cylinder internal combustion engine which is operated by switching an operation mode thereof between an all-cylinder operation mode in which all of a plurality of cylinders are operated, and a partial-cylinder operation mode in which part of the plurality of cylinders are deactivated, the method comprising the steps of:

determining whether or not the engine is operated under predetermined deceleration operating conditions;

cutting off fuel supply to the engine, when it is determined in said determining step that the engine is operated under the predetermined deceleration operating conditions;

delaying a start of cut-off of the fuel supply in said fuel supply cut-off step for a predetermined time period after satisfaction of the predetermined deceleration operating conditions;

correcting ignition timing in a retarding direction, when the cut-off of fuel supply is being delayed in said delaying step; and setting an amount of correction of the ignition timing in said delaying step, to a different value, depending on whether the engine is in the all-cylinder operation mode or in the partial cylinder operation mode.

7. A method as claimed in claim 6, wherein said setting step includes setting the amount of correction to a larger value when the engine is in the partial-cylinder operation mode than when the engine is in the all-cylinder operation mode.

8. A method as claimed in claim 6, wherein said setting step includes progressively increasing the amount of correction during the predetermined time period.

9. A method as claimed in claim 6, wherein said setting step includes setting the amount of correction to a smaller value as a rotational speed of the engine is higher.

10. A method as claimed in claim 6, wherein said setting step includes setting the amount of correction such that the ignition timing is progressively returned in an advancing direction, when the predetermined deceleration operating conditions cease to be satisfied before the predetermined time period elapses.

11. An engine control unit including a control program for causing a computer to control ignition timing of a variable-cylinder internal combustion engine which is operated by switching an operation mode thereof between an all-cylinder operation mode in which all of a plurality of cylinders are operated, and a partial-cylinder operation mode in which part of the plurality of cylinders are deactivated, wherein the control program causes the computer to determine whether or not the engine is operated under predetermined deceleration operating conditions, cut off fuel supply to the engine when it is determined that the engine is operated under the predetermined deceleration operating conditions, delay a start of cut-off of the fuel supply for a predetermined time period after satisfaction of the predetermined deceleration operating conditions, correct ignition timing in a retarding direction when the cut-off of fuel supply is being delayed, and set an amount of correction of the ignition timing, to a different value, depending on whether the engine is in the all-cylinder operation mode or in the partial-cylinder operation mode.

12. An engine control unit as claimed in claim 11, wherein the control program causes the computer to set the amount of correction to a larger value when the engine is in the partial-cylinder operation mode than when the engine is in the all-cylinder operation mode.

13. An engine control unit as claimed in claim 11, wherein the control program causes the computer to progressively increase the amount of correction during the predetermined time period.

14. An engine control unit as claimed in claim 11, wherein the control program causes the computer to set the amount of correction to a smaller value as a rotational speed of the engine is higher.

15. An engine control unit as claimed in claim 11, wherein the control program causes the computer to set the amount of correction such that the ignition timing is progressively returned in an advancing direction, when the predetermined deceleration operating conditions cease to be satisfied before the predetermined time period elapses.

* * * * *